W. J. STORRS.
SPRING WHEEL.
APPLICATION FILED MAY 25, 1908.

919,490.

Patented Apr. 27, 1909.

Witnesses

Inventor
W. J. Storrs

Attorneys

UNITED STATES PATENT OFFICE.

WILLIAM J. STORRS, OF CHICAGO, ILLINOIS.

SPRING-WHEEL.

No. 919,490.

Specification of Letters Patent.

Patented April 27, 1909.

Application filed May 25, 1908. Serial No. 434,848.

To all whom it may concern:

Be it known that I, WILLIAM J. STORRS, a citizen of the United States, residing at Chicago, in the county of Cook and State of Illinois, have invented certain new and useful Improvements in Spring-Wheels; and I do declare the following to be a full, clear, and exact description of the invention, such as will enable others skilled in the art to which it appertains to make and use the same.

My invention relates to spring wheels, and the object of the invention is to improve upon the present type of wheel now in common use.

Heretofore the springs of the wheels have been disposed inside and outside of the felly and the outside springs were protected by an annular sheath. It was impossible to adjust the tension of this outside spring without first removing the sheath. This rendered the adjustment expensive and tedious and it is the object of my invention to obviate these difficulties in a cheap and efficient manner.

Broadly stated, the invention comprises means to adjust the outer spring which is covered by the sheath, and means whereby said adjusting means may be operated without removing the sheath.

Figure 1:
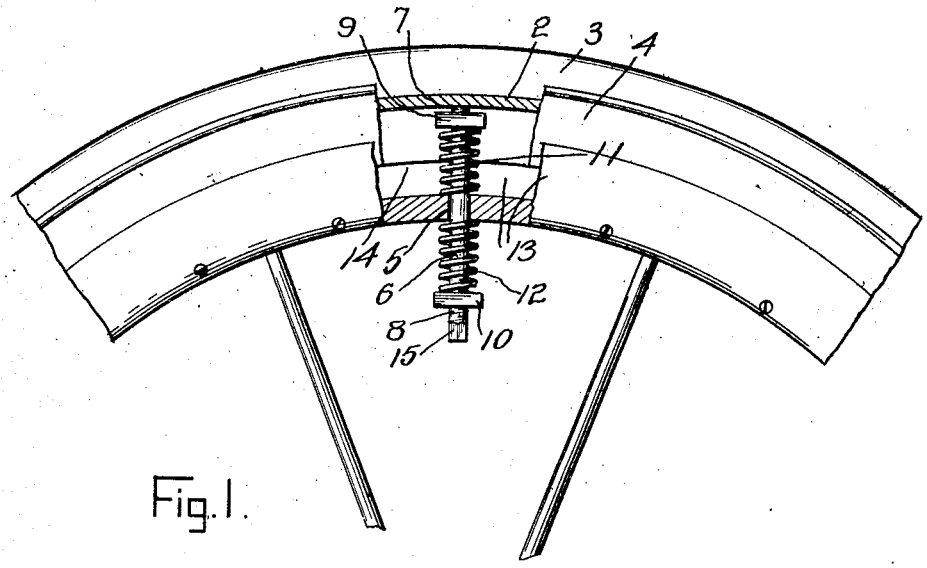
Figure 2:
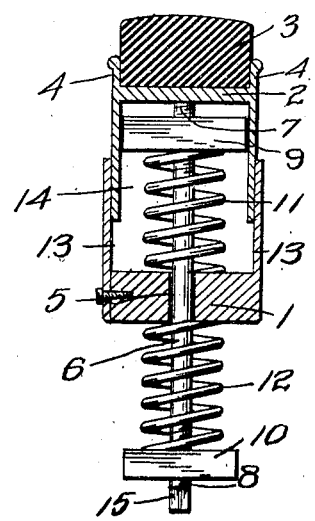

In the drawings,—Figure 1 is a fragmentary side elevation with parts broken away; and Fig. 2 is a transverse vertical section through one of the adjusting devices.

Referring more especially to the drawings 1 represents the felly and 2 the tire upon which is mounted the usual auxiliary cushion 3. In this instance the cushion is held in place by flanges 4 which extend around the tire and downwardly from the tire 2. The flanges 4 extend beyond the tire 2 so as to overlap the sides of the rubber cushion 3. The felly is apertured at 5 to receive the spring receiving bolt 6 which is threaded at both ends as at 7 and 8 to receive the adjusting nuts 9 and 10, which hold the compression springs 11 and 12 between the nuts and the felly. The upper end of the adjusting bolt 6 is loosely engaged upon the under side of the tire 2 and the inner end projects beyond the felly.

Extending up from the felly 1 on either side thereof are annular flanges 13 which overlap the flanges 4 and thereby form a compartment 14 in which the outer springs 11 are located.

The nut 9 is made square and is of sufficient diameter to have its side engage the inner part of the flanges 4, so as to prevent turning thereof and the inner end of the bolt or rod 6 is squared as at 15 so as to receive a wrench or other suitable tool whereby the rod may be turned within the nut 9 so as to adjust the same within the nut and thereby adjust the tension of the springs 11 and 12. The nut 10 may be adjusted at any time as it is freely exposed as shown.

By providing a device of this character the resiliency of the wheel may be adjusted at a moment's notice without any appreciable trouble or time consumed.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described and ascertained the nature of my invention, what I claim as new and desire to secure by Letters-Patent, is:—

1. In a spring wheel, the combination with an apertured felly, of a tire separated therefrom, inwardly extending walls carried by the tire for forming a chamber between the tire and the felly, rods slidably mounted in the apertures of the felly and adapted to loosely engage the tire, springs mounted upon the rods within the chamber, nuts carried upon said rods within the chamber and adapted to engage the walls to hold the same from turning, and a squared wrench receiving end on the rod for turning the same within the nut so as to adjust the nut without entering the chamber, together with means to hold the tire and felly in alinement.

2. In a spring wheel, the combination with an apertured felly, of a tire separated therefrom, inwardly extending walls carried by the tire for forming a chamber between the tire and the felly, rods slidably mounted in the apertures of the felly and adapted to loosely engage the tire, springs mounted upon the rods within the chamber, nuts carried upon said rods within the chamber and adapted to engage the walls to hold the same from turning, nuts on the rods without the chamber, springs arranged between the last named nuts and the felly, and flanges carried by the felly extending beyond the walls to hold the tire and felly in alinement.

In testimony whereof, I have hereunto set my hand in presence of two subscribing witnesses.

WILLIAM J. STORRS.

Witnesses:
BENJAMIN H. BURK,
AUGUST ALSTAD.